United States Patent
Phelps et al.

(10) Patent No.: US 10,988,993 B2
(45) Date of Patent: Apr. 27, 2021

(54) WIRELESS SHEAVE WHEEL ASSEMBLY WITH IMAGINING CAPABILITIES FOR WELL OPERATIONS

(71) Applicant: GEODYNAMICS, INC., Millsap, TX (US)

(72) Inventors: Phillip Phelps, Fort Worth, TX (US); Rick Wallace, Azle, TX (US); Cameron Kirkpatrick, Ft. Worth, TX (US)

(73) Assignee: GEODYNAMICS, INC., Millsap, TX (US)

( * ) Notice: Subject to any disclaimer, the term of this patent is extended or adjusted under 35 U.S.C. 154(b) by 0 days.

(21) Appl. No.: 16/665,642

(22) Filed: Oct. 28, 2019

(65) Prior Publication Data

US 2020/0131863 A1    Apr. 30, 2020

Related U.S. Application Data

(63) Continuation-in-part of application No. 16/390,158, filed on Apr. 22, 2019.

(60) Provisional application No. 62/750,884, filed on Oct. 26, 2018.

(51) Int. Cl.
*E21B 19/00* (2006.01)
*H04N 5/225* (2006.01)
*H04N 5/247* (2006.01)
*H04N 7/18* (2006.01)
*G01L 5/04* (2006.01)

(52) U.S. Cl.
CPC .............. *E21B 19/008* (2013.01); *G01L 5/04* (2013.01); *H04N 5/2252* (2013.01); *H04N 5/2253* (2013.01); *H04N 5/247* (2013.01); *H04N 7/181* (2013.01); *H04N 2005/2255* (2013.01)

(58) Field of Classification Search
CPC ...... E21B 19/08; E21B 19/084; E21B 19/008; E21B 47/04
See application file for complete search history.

(56) References Cited

U.S. PATENT DOCUMENTS

| 9,162,853 | B2 | 10/2015 | Ives et al. | |
| 2010/0097450 | A1* | 4/2010 | Pugh | H04N 7/185 348/61 |
| 2010/0147510 | A1* | 6/2010 | Kwok | G01V 11/00 166/250.01 |

(Continued)

FOREIGN PATENT DOCUMENTS

WO    2018026744 A1    2/2018

OTHER PUBLICATIONS

Industrial Sensors & Instruments, Inc., "Tension Links; TLG Series Tension Links", retrieved from the internet: http://www.i-s-i.com/; retrieved on Apr. 5, 2019.

(Continued)

*Primary Examiner* — David Carroll
(74) *Attorney, Agent, or Firm* — Patent Portfolio Builders PLLC

(57) ABSTRACT

A sheave wheel assembly includes a housing; a wheel attached to the housing and configured to rotate relative to the housing; an imaging system attached to the housing and configured to obtain images of a surrounding of the sheave wheel assembly; and a transceiver attached to the housing and configured to send the images in a wireless manner to a ground control system.

9 Claims, 11 Drawing Sheets

(56) References Cited

U.S. PATENT DOCUMENTS

| | | | |
|---|---|---|---|
| 2013/0138254 A1* | 5/2013 | Seals | E21B 7/068 |
| | | | 700/282 |
| 2014/0174727 A1* | 6/2014 | Huizer | E21B 47/13 |
| | | | 166/250.01 |
| 2017/0241221 A1 | 8/2017 | Seshadri et al. | |
| 2018/0298746 A1 | 10/2018 | Short et al. | |
| 2019/0203575 A1* | 7/2019 | Schlosser | G01L 5/047 |

OTHER PUBLICATIONS

SeaCOUNT-BT Sheave and Cable Counter, retrieved from internet: https://seafloorsystems.com/products/hydrographic/sidescan-sonar/products, retrieved from internet on Oct. 26, 2018.

Strainstall Limited, "Digitalization in the oil and gas sector: wireless measurement technology innovation for wellsite operations," James Fisher and Sons PLC, News and Press Releases, Sep. 18, 2018, 2 pages.

Strainstall Limited, "Strainstall partners with Baker Hughes, a GE company, in a pioneering product development project," James Fisher and Sons PLC, News and Press Releases, Aug. 16, 2018, 2 pages.

U.S. Office Action for related U.S. Appl. No. 16/390,158, dated Oct. 6, 2020. (All of the references cited in the Office Action are already of record.).

* cited by examiner

WIRELESS SHEAVE WHEEL ASSEMBLY WITH IMAGING CAPABILITIES FOR WELL OPERATIONS

BACKGROUND

Technical Field

Embodiments of the subject matter disclosed herein generally relate to wireline operations associated with an oil and gas well, and more specifically, to techniques and processes for lowering a tool in the well while monitoring not only the movement of the tool and/or a tension associated with the tool, but also the surroundings of the well.

Discussion of the Background

While a well is drilled or operated for extracting oil and gas, various tools need to be lowered into the well in a controlled manner, i.e., knowing the tension that is applied to the tool and also knowing the position of the tool in the well. Such a tool may be a cable (e.g., wireline, rope or other type of wire) that is connected to other tools, e.g., gun, setting tool, packer, valve, plug, etc. These tools are lowered into the well with the help of a derrick and/or crane.

Traditionally, as illustrated in FIG. 1, an oil exploration system 100 for lowering the tool 110 (wireline in this example) through a head 111 into the well 112, includes a wireline truck 120, its ground control system 130, and a crane or derrick 150 (only its top part is shown in the figure). The wireline 110 is attached with one end to a winding drum 122 of the wireline truck 120 and the other end is lowered into the well 112 and may be attached to a tool 114. Tool 114 may be a gun, string of guns, sub, switch, logging tool, setting tool, plug, or other well equipment. The wireline truck 120 has a wireline depth and tension measuring device 124, which not only guides the wireline 110, but also measures the movement of the line and the tension in the line. The wireline depth and tension measuring device 124 is connected to a depth and tension measurement unit 132, which receives the measured signals and transforms them in an actual length and/or tension. This information is then passed to a shooting system and/or logging system 134 and also to a hoist computer/controller 136. A computing device 138 (for example, a laptop) controls the shooting panel and the hoist computer. Information from the hoist computer 136 is distributed to various interfaces, for example, a display 140, a global controller 143, and another display 144, that are used by the operator of the wireline truck for maneuvering the wireline into the well.

The winding drum 122 is connected to a motor 125 that is controlled by a power controller 126. The power controller 126 receives its power from a power source 128, e.g., a generator or hydraulic power source. The power controller 126 interacts with the hoist computer 136 and is configured to respond to various commands from the wireline truck operator. Note that the wireline truck operator can interact with the various elements of the system 100 through the hoist computer 136 and/or the shooting panel 134. The shooting panel 134 is used mainly to shoot a gun, if the tool 114 is a gun string or includes a gun string.

System 100 also includes two sheave wheels 140 and 142. During a wireline operation, the bottom sheave wheel 140 is tied off to a secure tie point 141, for example attached to the head of the well 112, and the top sheave wheel 142 is suspended from the crane or derrick 150. The two sheave wheels are aligned with the winding drum 122 and the head of the well 112 so that the wireline 110 can be deployed inside the well. System 100 may also include a lubricator device 116 through which the wireline 110 passes before entering the well, to lubricate the wireline. The lubricator device may also be suspended from the crane or attached to the head of the well.

The top sheave wheel 142 is moved to a desired position by the crane boom 150 to allow for the wireline 110 to make the transition from the wireline truck 120 through the bottom sheave wheel 140 up and over the top sheave wheel 142 with a direct straight path into the pack-off 117 at the top of the lubricator device 116 and into the well bore 112. The currently used top sheave wheel has no line length (i.e., depth) or line tension measurement capability and it is only used to re-direct the wireline from the wireline hoist unit into the top of the lubricator.

In previous wireline operations (in particular, open hole applications), an individual tension link (not shown, but present instead of the wireline depth and tension measuring device 124), such as those manufactured by Industrial Sensors & Instruments (Texas, US) have been attached between the crane 150 and the top sheave wheel 142, with data connections to the wireline truck being made by an electric cable, for measuring the tension in the cable 110. This type of tension measurement is made in cases where the wireline measuring head is a "straight line" (see products from Bench Mark and/or Geo-Log, Texas, US) type of measuring device, and thus not capable of a wireline tension measurement.

As described above, the system 100 has multiple parts and components, some of which are stationary, but some of which are moving. For example, the line 110 continuously moves over the bottom and top sheave wheels 140 and 142, the drum 122 of the truck 120 is also rotating as long as the line 110 moves, the crane 150's boom may also be moving to adjust the position of the top sheave wheel 142. Even the truck 120 can be moving at some time. The movement of one or more of these parts may sometime negatively affect the operation of the overall system 100. For example, crane 150 may slip from its position, line 110 may get damaged, one or more of the sheave wheels may fail to rotate, the drum 122 may not respond as expected, the lubricator 116 may fail to receive the line 110 with the desired speed, etc. Any of these failures need to be observed by the operator of the system as soon as possible and remedied to prevent a shutdown of the oil extraction, which is an expensive exercise.

Thus, the operator of the system 100, who traditionally stays inside the control room of the truck 120 and has access to information about the well and the equipment deployed around the well only through the monitor 140 and the other displays 144, would need to either leave the control room and personally inspect, from outside the truck, the entire system, or would have to rely on information collected by the workers that handle the line 110. Under either scenario, the operator of the system does not have real-time access to this additional information. This means that in the eventuality that one or more of the parts of the system experiences a failure or misbehaves, the operator might not be able to quickly take corrective action.

Thus, there is a need for a new measuring system that overcomes the above deficiencies and/or a system that collects the additional information and offers the operator access to such information in real-time.

SUMMARY

According to an embodiment, there is a sheave wheel assembly including a housing, a wheel attached to the housing and configured to rotate relative to the housing, an imaging system attached to the housing and configured to obtain images of a surrounding of the sheave wheel assembly, and a transceiver attached to the housing and configured to send the images in a wireless manner to a ground control system.

According to another embodiment, there is a wireline system for well exploration, and the system includes a wireline to be lowered into the well, a top sheave wheel assembly configured to hold the wireline aligned and above a head of the well, a bottom sheave wheel configured to hold the wireline aligned with a wireline truck, and a ground control system configured to receive from the top sheave wheel assembly, in a wireless manner, images of a surrounding of the sheave wheel assembly.

According to still another embodiment, there is a method for monitoring a well, and the method includes attaching an imaging system to a top sheave wheel assembly, attaching the top sheave wheel assembly to a crane or derrick, placing a wireline over a wheel of the top sheave wheel assembly, lowering the wireline into the well, capturing images with the imaging system, which is directly attached to the top sheave wheel assembly, of a surrounding of the wireline, and transmitting in a wireless manner the captured images, from the top sheave wheel assembly to a ground control system.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a wireline that is dispatched inside of a well. However, the embodiments discussed herein are not limited to positioning a wireline in a well, but they may be applied to other tools that are introduced in an enclosure and their tension and/or position need to be known.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a monitoring system is attached to a sheave wheel (inside, outside or both) and this system communicates in a wireless manner with a wireline truck or another ground control system for providing real time information about a surrounding of the well. The monitoring system may include a power source that is regenerated by the turning of the sheave wheel and also may include a wireless transmitter for transmitting images of the system in a wireless manner, so that the monitoring system can operate independent of the other components of the system, and no extra cables are run from the monitoring system to the control system.

Figure 2:
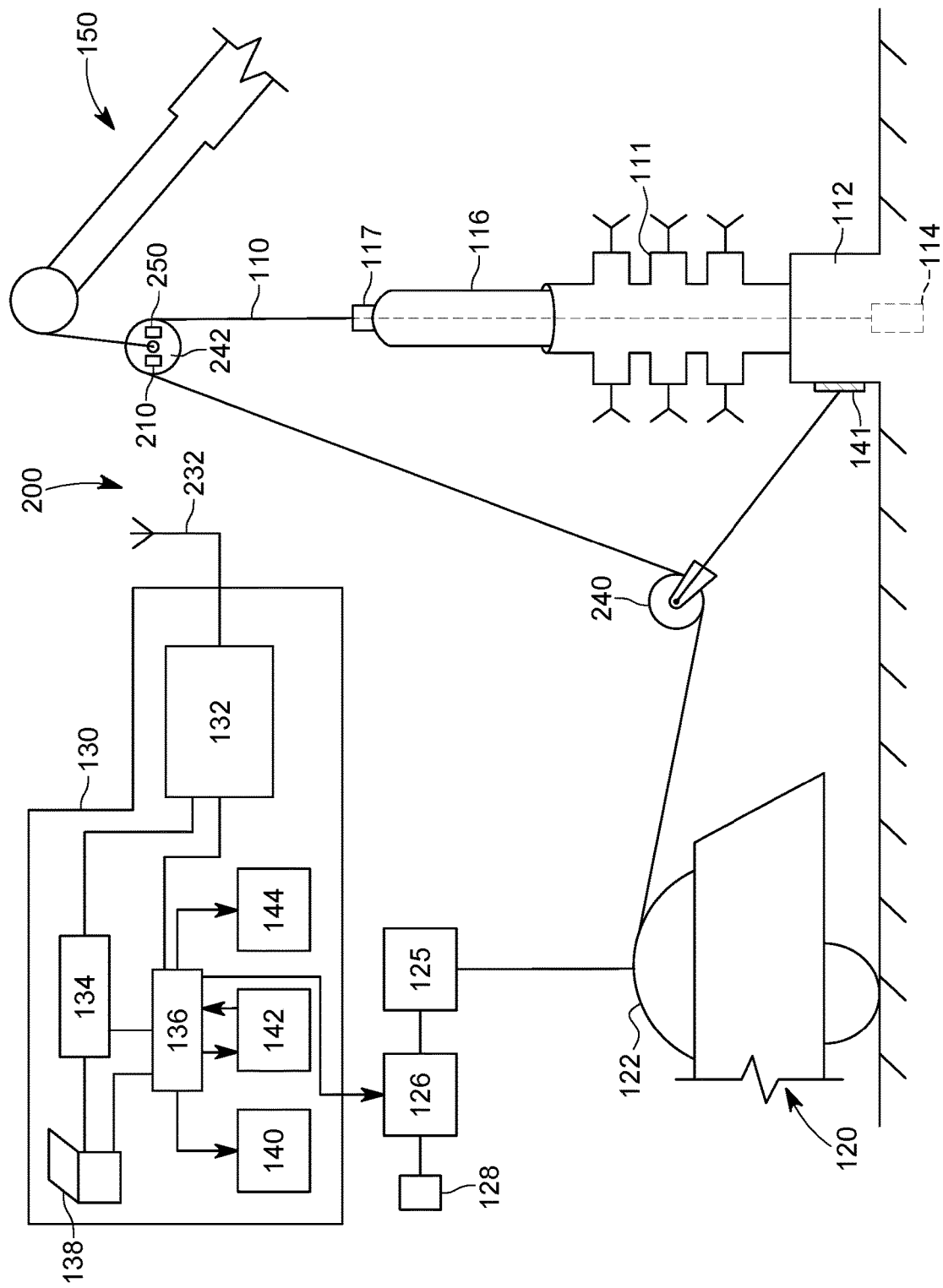
FIG. 2 illustrates a wireline distribution system that uses an imaging system and a wireless depth and tension measurement system attached to a top sheave wheel assembly.

FIG. 2 shows an oil and gas exploration system 200 that has a depth and tension measurement system 210 and/or an imaging system 250, both implemented on the top sheave wheel assembly 242. The configuration where only the depth and tension measurement system 210 is present is first discussed, followed by a discussion of a configuration where both of the systems 210 and 250 are present on the top sheave wheel assembly 242. The depth and tension measurement system 210 communicates in a wireless manner with an antenna 232 of a ground control system 130, which may be located on the wireline truck 120 or on the ground. Thus, measurements related to the line 110 movements and/or its tension are transmitted to the ground control system 130 without any wires, which likely would made the entire system 200 more easily to control and use.

By placing the depth and tension measurement system 210 on the top sheave wheel assembly, the measurements' accuracy is improved. In this regard, the currently used wireline units are susceptible to inaccuracies because of mis-calibration and are prone to other inaccuracies, such as line slippage between the measuring wheel and the line, and variations in line diameter from manufacture variation or line wear. In this regard, the wireline industry standard line measurement system is accomplished with a wireline measure head 124. The measurement of the line 110 length is accomplished by a calibrated (or electronically compensated, uncalibrated) measure wheel that is turned by the line traversing through the measure head in a precise manner. Because of contaminates that get attached to the wireline (for example, well fluids, or other non-well related contaminates), a measurement of the longitudinal length of the wireline by a measure wheel in the measure head is prone to errors, not the least of which is slippage, i.e., the circumference of the measuring device slippage along the longitudinal length of the wireline.

The primary reason for slippage is that only a small area of contact around the circumference of the measure wheel is in actual contact with the wireline. In the case of the wireless sheave wheel assembly 242, especially in the case of the sheave wheel in the top position as illustrated in FIG. 2, the wireline 210 wraps nearly 180° around the circumference of the measure wheel. This fact alone virtually eliminates any slippage between the wireline and the measure wheel. The actual sheave wheel assembly 242 need not be specially calibrated mechanically, as any errors that are present can be compensated for within the electronic measure conversion, i.e., the generation of electrical signals from the measure wheel measurement.

Figure 1:
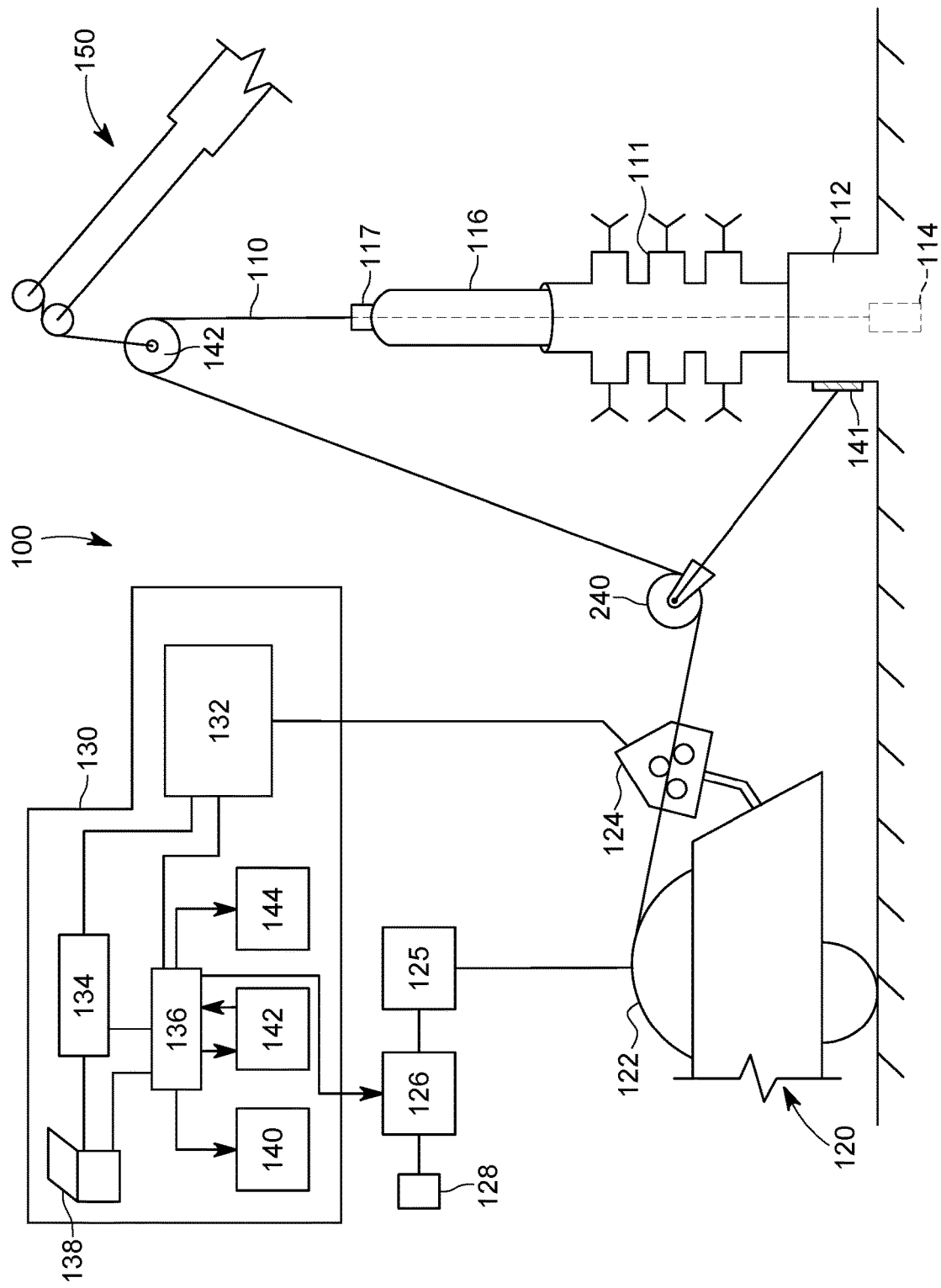
FIG. 1 illustrates a traditional wireline distribution system.

In the same manner, the line tension measurement made in the traditional measure head 124 in FIG. 1 is accomplished by a very small deflection of the line thru the measure device, which equates to a very small fraction of the actual line tension being measured. Errors in calibration are exaggerated by this small ratio. The upper sheave wheel assembly 242 in FIG. 2 does not face this problem as the tension measurement is nearly double the actual line tension, again, because of the nearly full wrap around the sheave wheel of the wireline. Because of this high degree of wrap, any errors in measurement are actually reduced when converted to electrical signals. In one application, it is envisioned that the upper sheave wheel assembly 242 in FIG. 2 could easily replace the measure head assembly 124 in FIG. 1, as the primary line measurement device.

Therefore, the linear line measurement made on the top sheave wheel assembly as illustrated in FIG. 2 eliminates the chance of line slippage between the line and the wheel (because of the wrap of the line 110 around the measuring wheel of the top sheave wheel assembly, which is near to 180°) and the measurement accuracy of the line's tension is improved by the fact that the line tension measured at the top sheave wheel assembly 242 is double the actual line tension (because of the wrap angle around the sheave wheel).

Existing line tension measurement devices currently only measure a small fraction of the actual line tension and resolve the small measurement into the actual line tension because of the low angle of deflection of the wireline through the measuring head. If the tension measurement is made from the bottom sheave wheel, (i.e., a load cell is attached to the bottom sheave wheel connection 141), then the measured line tension is still less than the actual tension because of the less than 180° wrap of line 110 around the wheel of the bottom sheave wheel assembly 240. As the measurement accuracy is very dependent upon the operator performing accurate angular measurements of the line wrap around the bottom sheave wheel, this method also fails to provide accurate results for the tension measurement.

However, the embodiment shown in FIG. 2 avoids these problems because the line 110 is almost perfectly wrapped around the wheel of the top sheave wheel assembly 242, and thus, the tension measured by the depth and tension measurement system 210 is double the tension in the line.

Figure 3:
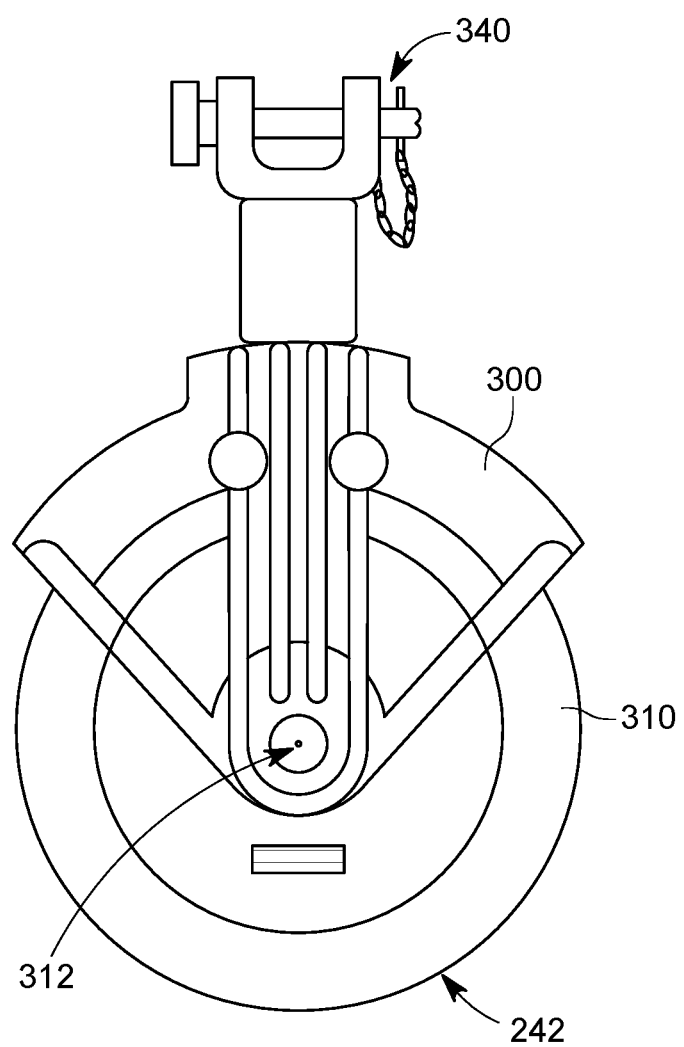
FIG. 3 illustrates the top sheave wheel assembly.
Figure 4:
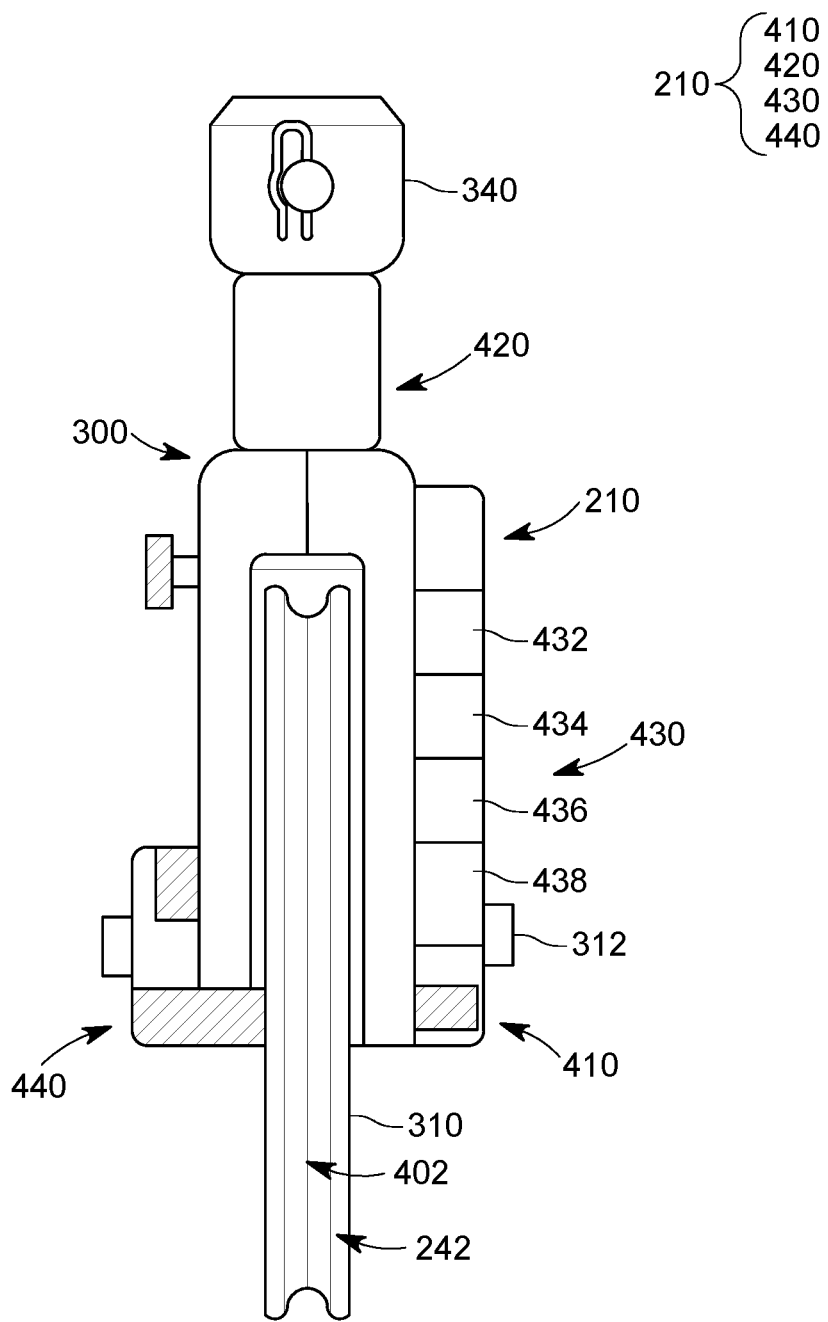
FIG. 4 illustrates the depth and tension measurement system.

The depth and tension measurement system 210 is now discussed in more detail with regard to FIGS. 3 and 4. FIG. 3 is an overall view of the top sheave wheel assembly 242 and includes a housing 300 that partially encloses a wheel 310. Wheel 310 is attached to the housing 300 with an axle 312. Wheel 310 is configured to rotate about the axle 312. A shackle 340 is attached to the housing 300 and the shackle is configured to be attached to the boom of a crane (not shown) or to a derrick.

FIG. 4 is a side view of the top sheave wheel assembly 242 and the depth and tension measurement system 210. Housing 300, wheel 310, and axle 312 are visible in this figure. In addition, a rotation measurement device 410 located on the housing 300 is also visible. Rotation measurement device 410 may be located inside or on the outside of the housing 300. The rotation measurement device 410 is configured to count how many times the wheel 310 turns when the line 110 (not shown) rotates with the wheel so that a length of the line's traveling distance may be estimated by a controller. To ensure that the line does not slip over the wheel, the wheel 310 has a groove 402 in which the line 110 fits. The rotation measurement device 410 may be a tachometer that includes an optical sensor or Hall effect sensor for counting the rotations of the wheel 310 relative to the axle 312. However, other types of sensors may be used.

The depth and tension measurement system 210 may also include a tension measurement device 420, that is located between the housing 300 and the shackle 340. The tension measurement device 420 may be a load cell, which is a transducer that creates an electrical signal whose magnitude is associated with the force or tension measured. Other sensors may be used for measuring the tension in the cable 110. Although FIG. 4 shows the tension measurement device 420 being located between the housing 300 and the shackle 340, it is possible to locate the sensor in the axle 312 or at other locations.

Measurements from the rotation measurement device 410 and the tension measurement device 420 are collected at local control system 430. Local control system 430 may include a processor 432 for processing the received signals (for example, digitizing the signals and mapping the measured signals to actual lengths and forces experienced by the line 110), a memory 434 for storing the signals and software necessary for processing the signals, a wireless transceiver 436 that is capable of transmitting data with a transmitter to the ground control system 130 and also for receiving, with a receiver, data, instructions and/or commands from the ground control system 130. The wireless transceiver 436 may use FM frequency, AM frequency, Bluetooth technology, infrared technology, Wi-Fi or other known wireless technologies for communicating with the ground control system 130. The control system 430 may also include a battery 438 and various other electronics. In one application, a generator 440 may also be provided in the housing 300 to interact with the wheel 310 so that electrical energy is generated as the wheel 310 is turning. The generated electrical energy is supplied to the control system 430 for recharging the battery 438 and/or for distributing it to other components.

Figure 5:
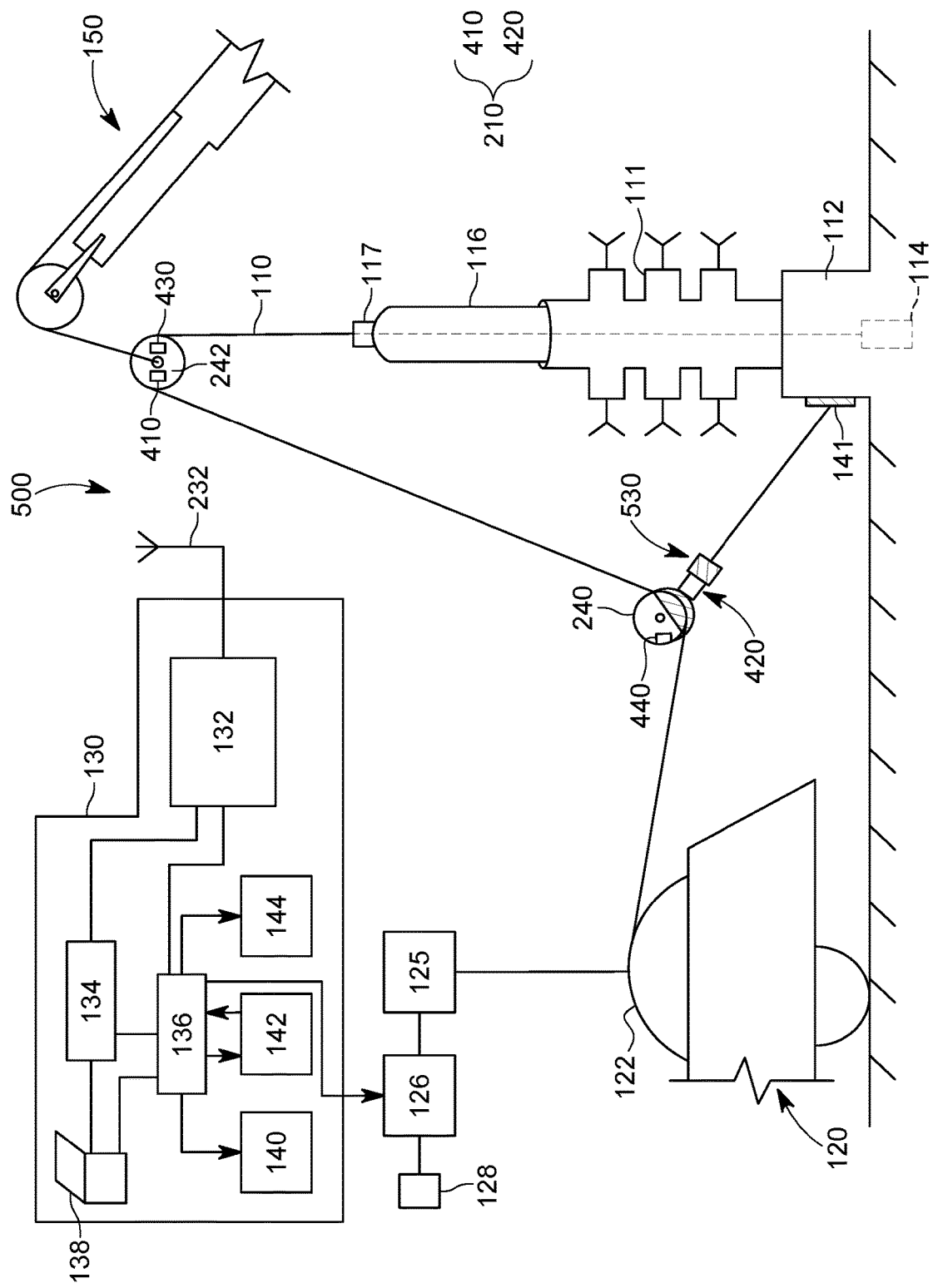
FIG. 5 illustrates another implementation of the depth and tension measurement system.

In one embodiment, as illustrated in FIG. 5, the components of the depth and tension measurement system 210 are distributed between the top sheave wheel assembly 242 and the bottom sheave wheel assembly 240 as follows. The rotation measurement device 410 and the local control system 430 are left on the top sheave wheel assembly 242, so that this system measures only the movement of the line 110. The tension measurement device 420 and an additional local control system 530, that may be identical to the original local control system 430, are installed on the bottom sheave wheel assembly 240. The local control systems 430 and 530 may be configured to exchange data only with the ground control system 130, and/or to communicate between them and with the ground control system. Both local control systems 430 and 530 have the capability to exchange data in a wireless manner and also to receive energy from a local battery and/or an electrical generator 440 that is located on the housing of each wheel assembly and is activated by the rotation of each corresponding wheel.

Note that although the previous embodiments disclosed placing the rotating measurement device 410 on the housing 300 of the top sheave wheel assembly 242, it is possible to set the rotating measurement device 410 directly on the wheel 310, for example, as an accelerometer.

Figure 6:
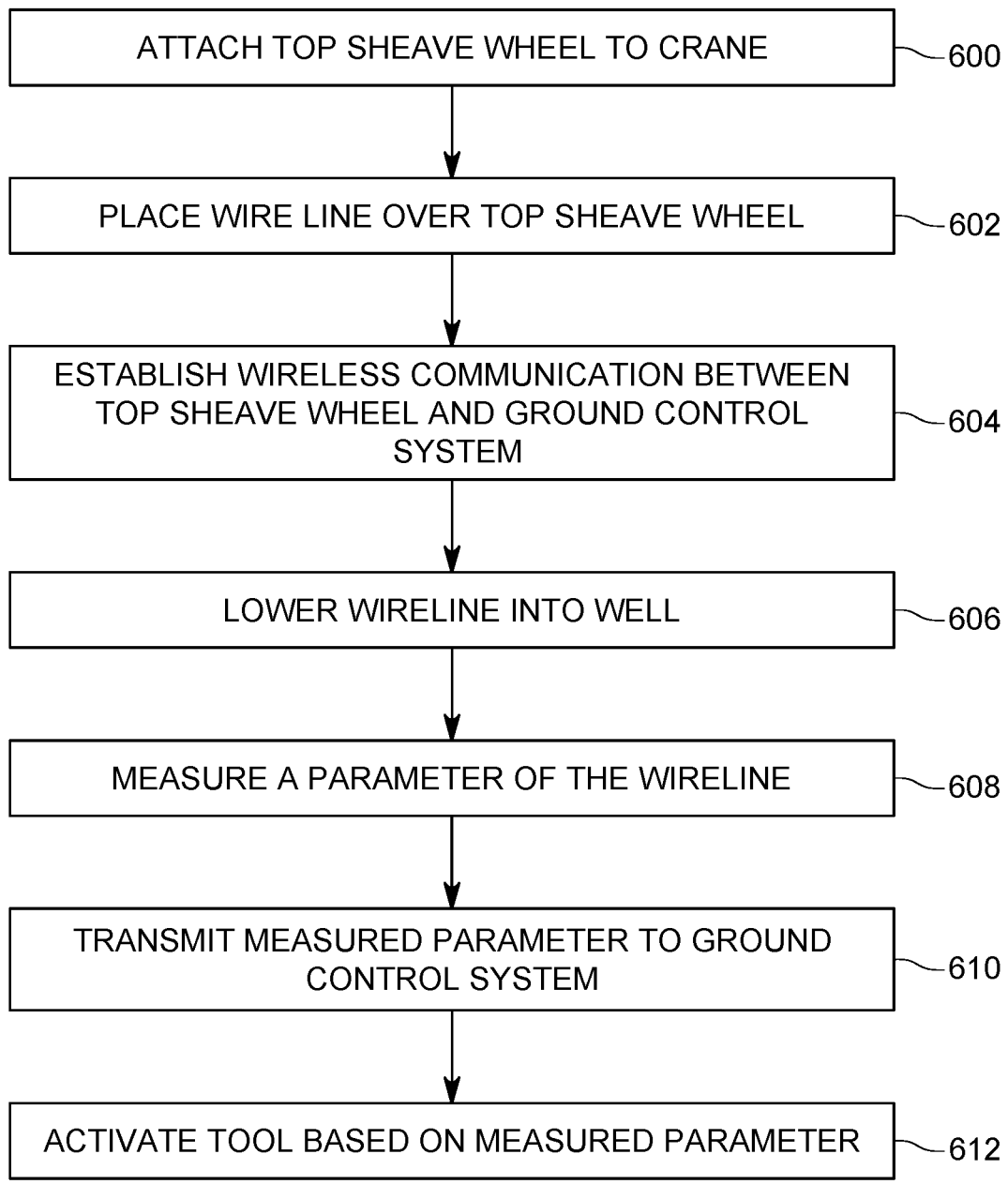
FIG. 6 is a flowchart of a method for using the depth and tension measurement system.

A method for operating a wireline system that includes one or both of the top and bottom sheave wheel assemblies 240 and 242 is now discussed with regard to FIG. 6. The method includes a step 600 of attaching a top sheave well assembly 242 to a crane, wherein the top sheave well includes a depth and tension measurement system 210. In step 602, a wireline 110 (or another well related tool) from a wireline truck is placed over the top sheave wheel. In step 604, wireless communication is established between a ground control system 130 and the depth and tension measurement system 210. In step 606, the wireline 110 is lowered into the well 112 and in step 608 one parameter of the wireline (for example, the travel distance or the tension in the wireline 110 or both) is measured with the depth and tension measurement system 210. In step 610, information associated with the measured parameter is transmitted in a wireless manner, from the depth and tension measurement system 210 to the ground control system 130. Depending on this information, the operator of the wireline ground control system 130 decides in step 612 to perform an action with a tool attached to the wireline, for example, if the parameter describes the distance travelled by the wireline into the well, activate the guns or activate a setting tool when the position underground of that tool has reached its desired target. Other actions may be implemented with the wireline.

Figure 7:
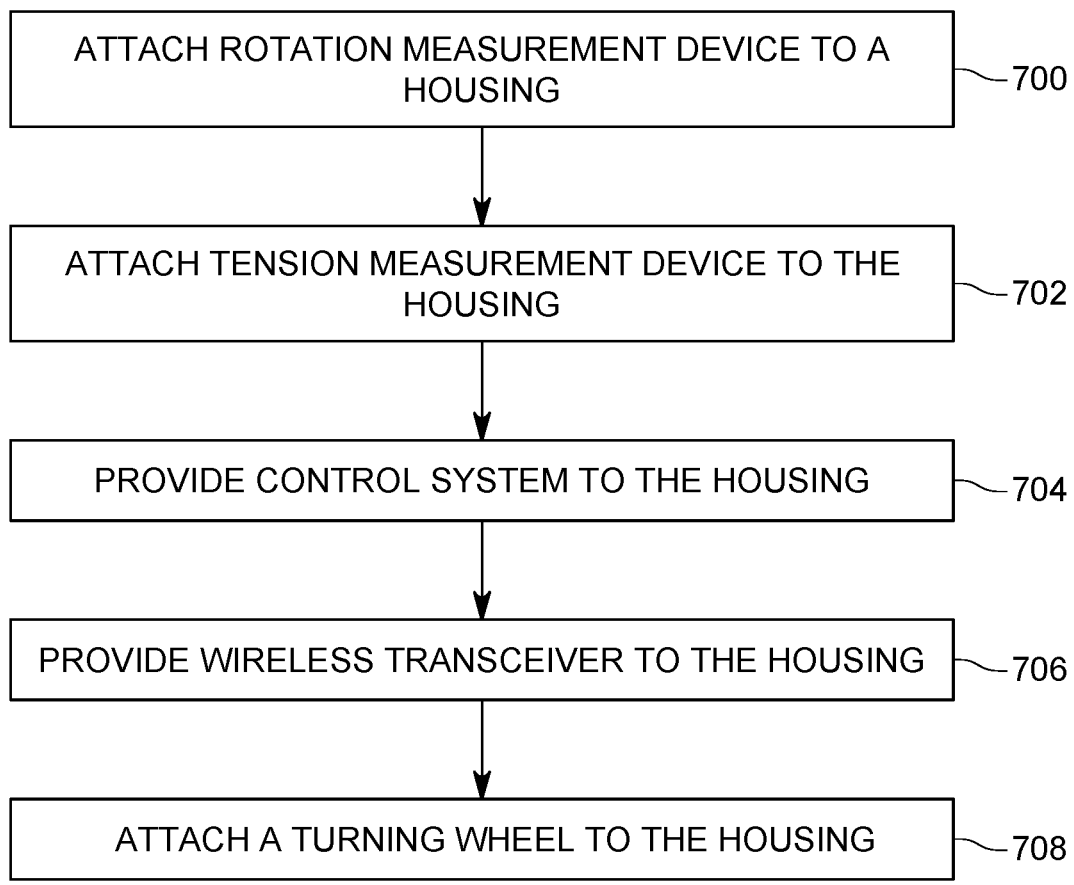
FIG. 7 is a flowchart of a method for manufacturing a sheave wheel having a depth and tension measurement system.

A method for manufacturing a depth and tension measurement system 210 is now discussed with regard to FIG. 7. The method includes a step 700 of attaching a rotation measurement device 410 to a housing 300 of a top sheave wheel assembly 242, a step 702 of attaching a tension measurement device 420 to the housing, a step 704 of providing a local control system 430 on the housing, where the control system is electrically connected to the rotation measurement device 410 and the tension measurement device 420, a step 706 of providing a wireless transceiver on the housing, in electrical communication with the local control system, and a step 708 of attaching a wheel, that is free to turn, to the housing.

Figure 8:
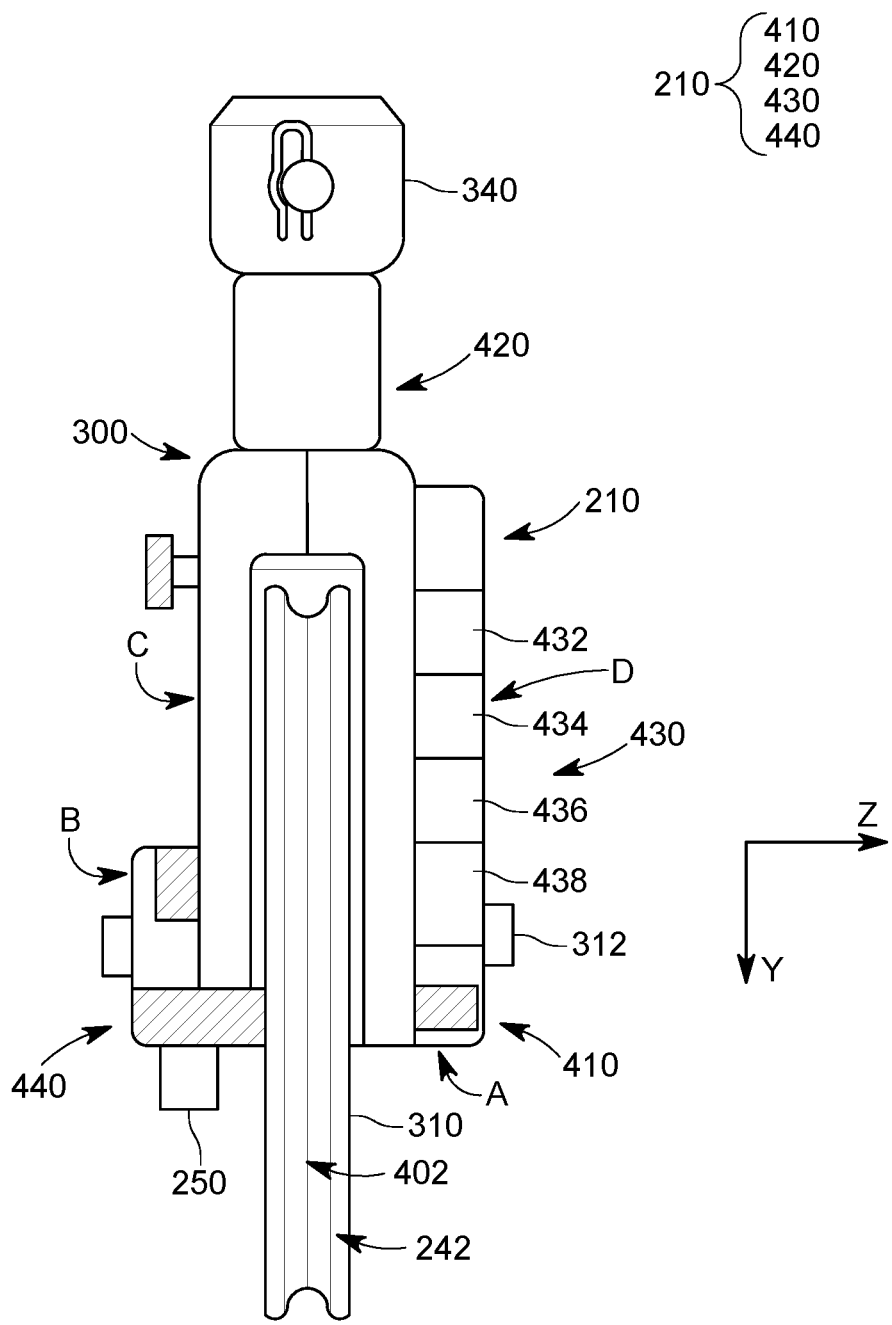
FIG. 8 illustrates the imaging system attached to the top sheave wheel assembly.

FIG. 8 illustrates another embodiment in which the imaging system 250 is present, in addition to the depth and tension measurement system 210. Note that in one embodiment, the imaging system may be installed on the sheave wheel assembly without the depth and tension measurement system 210. The imaging system 250 is show in FIG. 8 being attached to a bottom of the generator 440. However, the imaging system 250 may be attached at other locations on the top sheave wheel assembly 242, as indicated by arrows A to D in FIG. 8. The imaging system 250 is illustrated in more detail in FIG. 9 and includes a frame 900 to which a first camera 910 is attached. The first camera 910 may be a still image camera or a video camera. Any type of known cameras may be used. Optionally, the imaging system 250 may also include a second camera 920, also attached to the frame 900. The second camera 920 may be a still image camera or a video camera. A local controller 930 is attached to the frame 900 and connected to an external plug 940, which is configured to connect to the generator 440 or battery 438 for receiving power and/or to the control system 430 for exchanging information with the processor 432. Processor 432 may be configured to transmit the images (pictures and/or video) taken by the first and second cameras, through the transceiver 436, to the ground control system 130, via the antenna 232. The processor 432 may use the power from the battery 438 to power the first and second cameras. However, if the power level in the battery 438 is low, the processor 432 may switch the power supply to the generator 440. In one embodiment, the processor 432 may reconfigure the various elements of the control system 430 so that the generator 440 recharges the battery 438.

Figure 9:
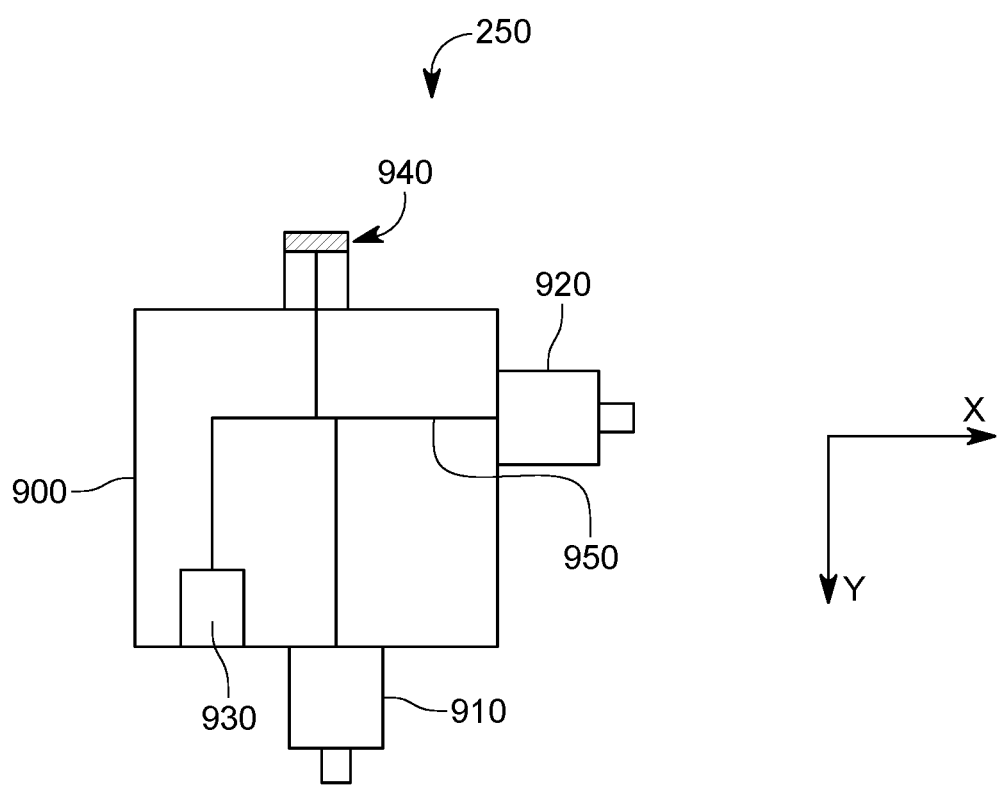
FIG. 9 illustrates fixed first and second camera associated with the imaging system.

The local controller 930 (which may be a processor) is also connected through bus 950 to the first and second cameras 910 and 920, as illustrated in FIG. 9. In this way, the local controller 930 is able to control the cameras, for example, when to switch them on and off. Further, the local controller is configured to receive the images from the cameras and transmit them to controller 432. The plug 940 is configured to include wires for exchanging power between the generator 440 and/or the battery 438, and the local controller 930. In addition, the plug 940 is configured to include additional wires for exchanging data between the local controller 930 and the processor 432, for example, commands and/or video information. In one application, the same wires may be used for transmitting power and data.

In one embodiment, the first camera 910 is configured to point along the gravity Y while the second camera 920 is configured to point in a horizontal direction X, which is perpendicular or some other angle to the gravity Y. Further, the horizontal direction X may be chosen to be perpendicular to the axel 312 of the wheel 310. Thus, with this arrangement, the first camera 910 feeds images about well head 111 and associated equipment entering the well or surrounding the well while the second camera 920 feeds images about the wireline 110 and the top sheave wheel assembly 242. In this way, the operator of the system 100 is capable to monitor the system 100 and its surroundings on the monitors 140 or 144, without leaving the control room or relying on second-hand information. Further, with this imaging system in place, the operator of the system 100 is capable to monitor in real-time all the system's components above ground and to take immediate corrective action if any of these components fails or misbehaves.

Figure 10:
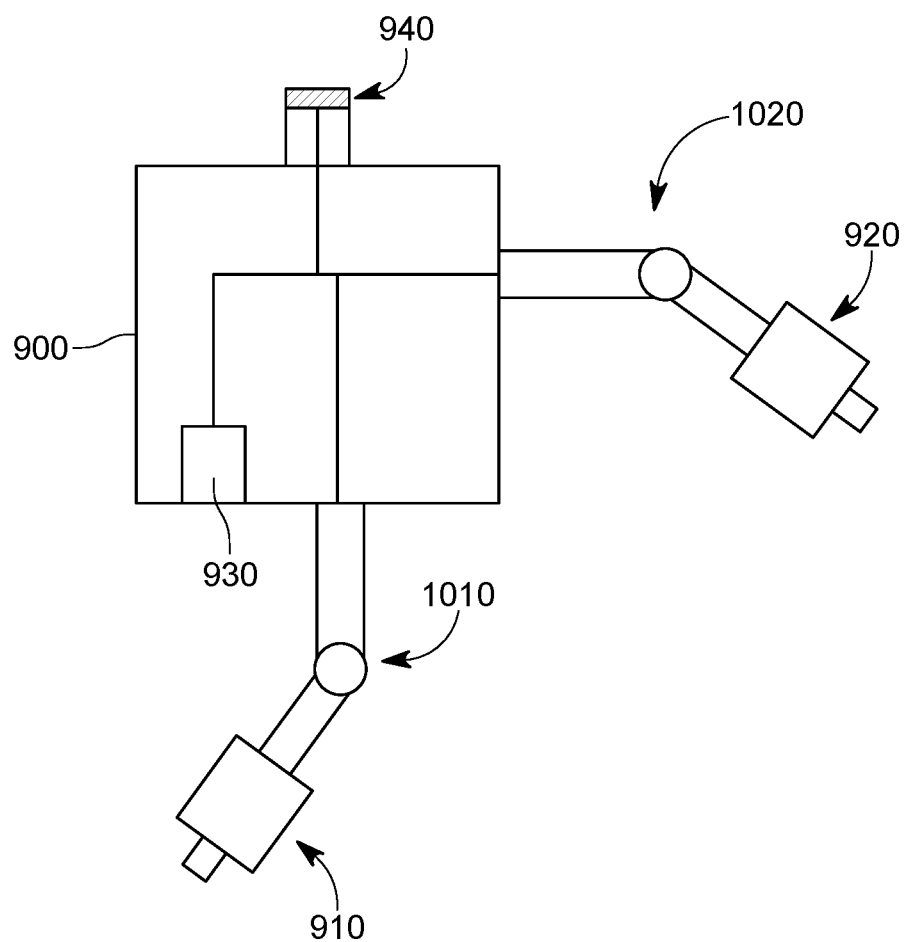
FIG. 10 illustrates movable first and second cameras associated with the imaging system.

For an enhanced experience, as illustrated in FIG. 10, at least one of the first and second cameras 910 and 920 may be connected through a moving arm 1010 and 1020, respectively, to the frame 900. The local controller 930 may be instructed by the operator to rotate the arms as desired, and/or to translate them. In this way, the operator can select which part of the system 100 to image in more detail. As the first and second cameras may have a zoom function, the operator may zoom in or out as desired to acquire a better view of a given component of the system. Note that the commands for rotating and/or translating one or both cameras are transmitted in a wireless manner by the ground control system to the local controller 432 so that no wire is necessary to connect the imaging system to the control room.

Figure 11:
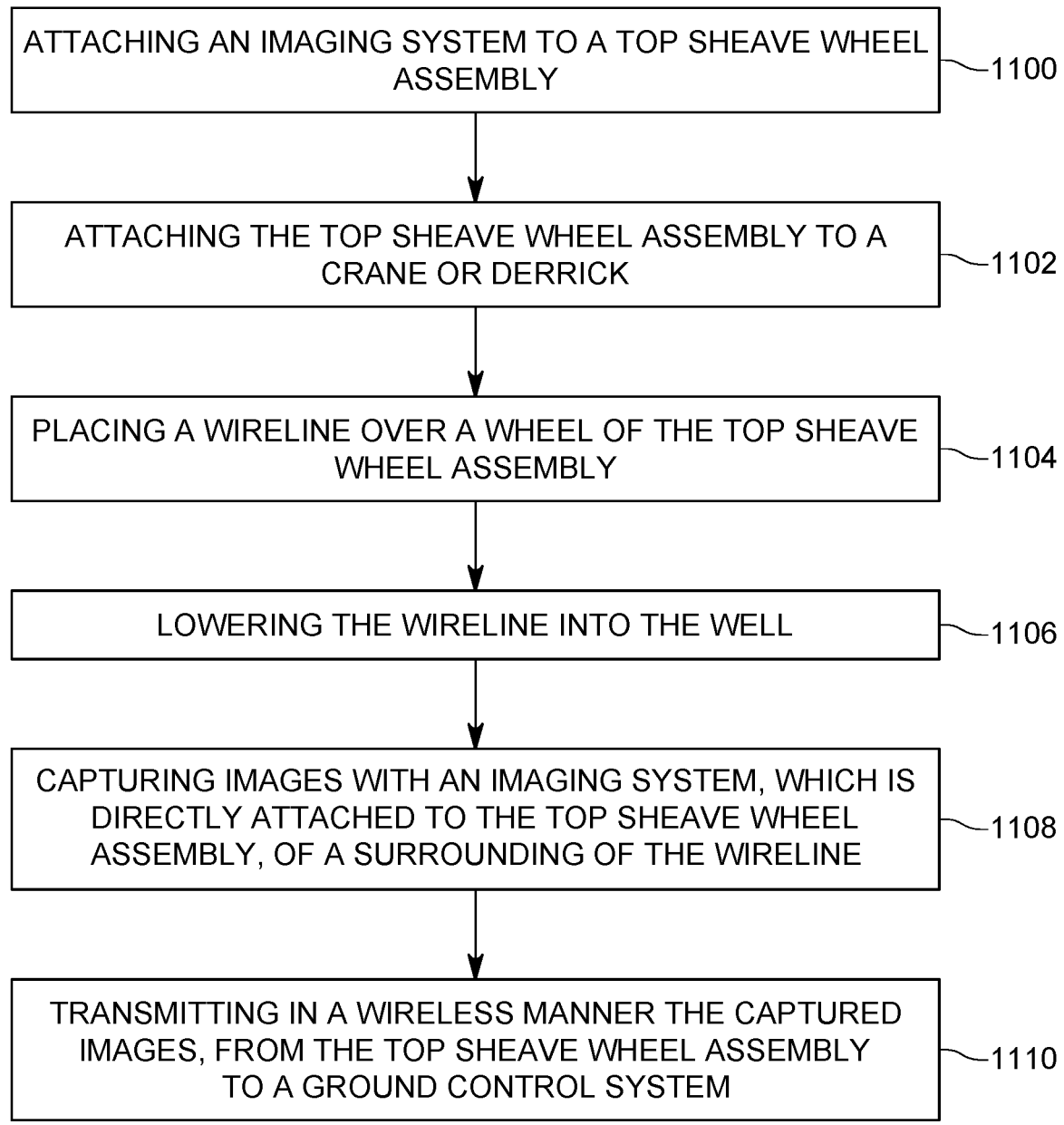
FIG. 11 is a flow chart of a method for taking images with the imaging device while lowering a line into a well.

A method for monitoring a well with the imaging system illustrated in FIGS. 9 and 10 is now discussed with regard to FIG. 11. The method includes a step 1100 of attaching the imaging system 250 to a top sheave wheel assembly 242, a step 1102 of attaching the top sheave wheel assembly 242 to a crane or derrick 150, a step 1104 of placing a wireline 110 over a wheel 310 of the top sheave wheel assembly 242, a step 1106 of lowering the wireline 110 into the well 112, a step 1108 of capturing images with the imaging system 250, which is directly attached to the top sheave wheel assembly 242, of a surrounding of the wireline 110, and a step 1110 of transmitting in a wireless manner the captured images, from the top sheave wheel assembly to a ground control system. The method may further include a step of taking images of the wireline with a first camera, and taking images of the well with a second camera, wherein the second camera is oriented along a direction that is perpendicular or some other angle to the first camera.

As noted above, the imagining system 250 may be used without the depth and tension measurement system 210 or in combination with such a system. If the depth and tension measurement system 210 is not present, then at least the battery 438, transceiver 436, and generator 440 may be connected to the imagining system 250 for providing data exchange capabilities and power supply. In one application, if both the imagining system 250 and the depth and tension measurement system 210 are present, it is possible to pack the imagining system 250 with its own power source and transceiver for being completely independent of the depth and tension measurement system 210. Those skilled in the art will understand that other combinations of the elements of these two systems are possible.

The disclosed embodiments provide a wireless imaging system which may be combined with a wireless depth and tension measurement system, and the combined system may be integrated on a sheave wheel assembly for wireline operation associated with a well. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A wireline system for well exploration, the system comprising:
   a wireline to be lowered into the well;
   a top sheave wheel assembly configured to hold the wireline aligned and above a head of the well;
   a bottom sheave wheel configured to hold the wireline aligned with a wireline truck; and
   a ground control system configured to receive from the top sheave wheel assembly, in a wireless manner, images of a surrounding of the sheave wheel assembly,
   wherein the top sheave wheel assembly comprises:
   an imaging system configured to obtain the images of the surrounding of the sheave wheel assembly; and
   a transceiver configured to send the images in the wireless manner to the ground control system.

2. The system of claim 1, wherein the imaging system includes first and second cameras, the first camera being oriented along gravity and the second camera being oriented along a direction that is perpendicular to the gravity and to an axle of a wheel of the top sheave wheel assembly.

3. The system of claim 2, wherein at least one of the first and second cameras is configured to rotate.

4. The system of claim 1, wherein the top sheave wheel assembly is configured to be attached to a top of a crane or a derrick.

5. The system of claim 1, further comprising:
   a local control system that supplies power to the imaging system and transmits the images from the imaging system to the ground control system,
   wherein the local control system comprises:
   a processor;
   a memory that stores the images; and
   the transceiver, which is controlled by the processor and is configured to transmit the images, in the wireless manner, to the ground control system.

6. The system of claim 5, further comprising:
   a power generator attached to the housing and electrically connected to the local control system and configured to generate electrical energy from a rotation of the wheel to power the local control system.

7. The system of claim 1, further comprising:
   a depth and tension measurement system attached to the top sheave wheel assembly and configured to measure a parameter associated with a wheel of the top sheave wheel assembly.

8. A method for monitoring a well, the method comprising:
   attaching an imaging system to a top sheave wheel assembly;
   attaching the top sheave wheel assembly to a crane or derrick;
   placing a wireline over a wheel of the top sheave wheel assembly;
   lowering the wireline into the well;
   capturing images with the imaging system, which is directly attached to the top sheave wheel assembly, of a surrounding of the wireline; and
   transmitting in a wireless manner the captured images, from the top sheave wheel assembly to a ground control system.

9. The method of claim 8, further comprising:
   taking images of the wireline with a first camera; and
   taking images of the well with a second camera, wherein the second camera is oriented along a direction that is perpendicular to the first camera.

* * * * *